United States Patent
Scott et al.

(10) Patent No.: US 11,828,157 B2
(45) Date of Patent: Nov. 28, 2023

(54) IMAGE CORRECTION METHODS FOR DOWNHOLE INSPECTION TOOLS

(71) Applicant: E.V. OFFSHORE LIMITED, Norwich (GB)

(72) Inventors: Christopher Scott, Norwich (GB); Philip Brown, Norwich (GB); Steven Helmore, Aberdeenshire (GB); Jonathan Thursby, Norwich (GB); David Tynewydd, Norwich (GB); James Crisafulli, Norwich (GB)

(73) Assignee: E.V. OFFSHORE LIMITED, Norwich (GB)

( * ) Notice: Subject to any disclaimer, the term of this patent is extended or adjusted under 35 U.S.C. 154(b) by 569 days.

(21) Appl. No.: 16/971,948

(22) PCT Filed: Feb. 4, 2019

(86) PCT No.: PCT/GB2019/050288
§ 371 (c)(1),
(2) Date: Aug. 21, 2020

(87) PCT Pub. No.: WO2019/162641
PCT Pub. Date: Aug. 29, 2019

(65) Prior Publication Data
US 2021/0087920 A1    Mar. 25, 2021

(30) Foreign Application Priority Data

Feb. 21, 2018  (GB) .................................. 1802804
Feb. 21, 2018  (GB) .................................. 1802806
Feb. 21, 2018  (GB) .................................. 1802813

(51) Int. Cl.
*E21B 47/002*    (2012.01)
*G06T 7/73*    (2017.01)
(Continued)

(52) U.S. Cl.
CPC ............ *E21B 47/002* (2020.05); *G06T 5/006* (2013.01); *G06T 5/50* (2013.01); *G06T 7/248* (2017.01);
(Continued)

(58) Field of Classification Search
CPC ..... E21B 47/002; E21B 47/04; G01N 21/954; G01N 2021/9544; G01N 15/0612;
(Continued)

(56) References Cited

U.S. PATENT DOCUMENTS 8,547,428 B1*  10/2013  Olsson .................... G01C 15/00
                                                         348/374
2014/0320631 A1*  10/2014  Olsson ................. G01N 21/954
                                                         348/84

(Continued)

FOREIGN PATENT DOCUMENTS

EP            3091334 A1    11/2016

*Primary Examiner* — Masum Billah
(74) *Attorney, Agent, or Firm* — Hayes Soloway PC

(57) ABSTRACT

Methods for correcting for non-centred tool geometry in image data obtained by a conduit inspection tool are disclosed. Embodiments of the invention apply to inspection tools with one or multiple sideview cameras and to inspection tools with downview cameras. The methods include obtaining at least two overlapping images of the internal surface of the conduit using the tool, identifying one or more features common to at least a pair of the overlapping images, determining, based on the positions of the or each common feature, the position of the tool with respect to a longitudinal axis of the conduit, determining a correction function based on the position of the tool and applying the correction function to the image data. Methods for determining the dimension of a feature of interest on the internal surface of the conduit are also disclosed.

17 Claims, 14 Drawing Sheets

(51) Int. Cl.
    *G06T 7/246*      (2017.01)
    *G06T 5/00*       (2006.01)
    *G06T 5/50*       (2006.01)
    *G06T 7/60*       (2017.01)
    *H04N 23/90*      (2023.01)
    *H04N 23/50*      (2023.01)

(52) U.S. Cl.
    CPC ............... *G06T 7/60* (2013.01); *G06T 7/74* (2017.01); *H04N 23/90* (2023.01); *G06T 2207/30204* (2013.01); *G06T 2207/30241* (2013.01); *H04N 23/555* (2023.01)

(58) Field of Classification Search
    CPC ........... G01N 15/1429; G01N 15/1475; G01N 2015/1006; G01N 2021/8887; G01N 2021/9542; G01N 21/8803; G01N 21/8806; G01N 2021/9548; G01N 2223/628
    USPC .......................................................... 348/84
    See application file for complete search history.

(56) References Cited

U.S. PATENT DOCUMENTS

2017/0178379 A1\* 6/2017 Fu ......................... G06Q 10/043
2020/0105019 A1\* 4/2020 Boyle .................... H04N 23/90

\* cited by examiner

IMAGE CORRECTION METHODS FOR DOWNHOLE INSPECTION TOOLS

CROSS-REFERENCE TO RELATED APPLICATIONS AND PRIORITY

This patent application claims priority from PCT Patent Application No. PCT/GB2019/050288 filed Feb. 4, 2019, which claims priority from Great Britain Patent Application No. GB 1802804.3 filed Feb. 21, 2018, Great Britain Application No. GB 1802806.8 filing Feb. 21, 2018 and Great Britain Application No. 1802813.4 filed Feb. 21, 2018. Each of these patent applications are herein incorporated by reference in their entirety.

FIELD OF THE INVENTION

This invention relates to methods for applying geometrical corrections to image pixels to account for a camera not being centrally located within a conduit, and to methods for estimating the dimensions of features imaged by the camera. In particular, this technology applies to the real-time or post-processing of downhole video camera images from surface or subsurface pipes in the oil and gas industry.

BACKGROUND TO THE INVENTION

An inspection assembly or tool may be located downhole or within a conduit to image an internal surface of the conduit using one or more cameras carried by the tool.

Due to mechanical issues and the way that the inspection tool is deployed, the tool carrying the camera may not be centrally positioned in the pipe or conduit. Also, the axis of the tool may not be parallel to the axis of the pipe or conduit. The distance between the camera lens centre and the pipe centre or the internal surface and the angle of the lens relative to the pipe axis are often not known and can be difficult to determine by mechanical means.

The images obtained by a downhole camera can be in the form of still images or video obtained through downward or sideways facing lenses. The viewing position of each of the lenses is restricted because the lenses must be disposed on the surface of the logging tool. As described above, the position of this tool in the pipe or conduit may vary considerably from an ideal central location. This leads to points on the pipe or conduit surface being observed from a variety of unknown distances and angles.

As a result, interpretation of the obtained images can be challenging. For example, it can be difficult to accurately establish the dimension of an imaged feature in the conduit, and to accurately monitor features and events in the conduit.

Against that background, it would be desirable to provide methods for processing the images obtained by an inspection tool to correct for eccentricity and other geometrical conditions, and to permit accurate dimensioning of features.

SUMMARY OF THE INVENTION

A first aspect of the present invention provides a method for correcting for non-centred tool geometry in image data obtained by a conduit inspection tool having at least one camera for imaging the internal surface of a conduit. The method comprises:
  obtaining at least two overlapping images of the internal surface of the conduit using the tool;
  identifying one or more features common to at least a pair of the overlapping images;
  determining, based on the positions of the or each common feature, the position of the tool with respect to a longitudinal axis of the conduit;
  determining a correction function based on the position of the tool; and
  applying the correction function to the image data.

In this way, it is possible to determine the position of an inspection tool in a conduit and to correct the images obtained by the tool so that the correct spatial position of each pixel in the image can be assigned.

The inspection tool may comprise at least one sideview camera having a field of view with a centre line that extends substantially perpendicularly to a longitudinal axis of the tool. The inspection tool may for example comprise a plurality of sideview cameras arranged on a common plane perpendicular to the longitudinal axis of the tool.

In one embodiment, the overlapping images overlap circumferentially with respect to the longitudinal axis of the conduit. In this case, the circumferentially overlapping images may be obtained by simultaneously obtaining an image from each of the sideview cameras of an inspection tool having a plurality of sideview cameras. The circumferentially overlapping images may be obtained by obtaining a sequence of images from a single sideview camera, and rotating the camera through an angle less than the field of view of the camera between each image in the sequence.

When the images are circumferentially overlapping, determining the position of the tool may comprise:
  determining, from the common features identified in pairs of neighbouring images, the lengths of regions of overlap between the neighbouring images; and
  calculating, from the length of the regions of overlap, an offset between a longitudinal axis of the tool with respect to the longitudinal axis of the conduit.

In another embodiment, the method comprises obtaining a plurality of sets of overlapping images, wherein each set of images is obtained at a different angular position around the circumference of the conduit, wherein pairs of neighbouring images in each set of images overlap in a direction parallel to the longitudinal axis of the conduit.

In this case, determining the position of the tool may comprise:
  measuring the shift in position of common features between neighbouring images as a function of distance from the centre line of the field of view; and
  comparing the shift in position as a function of distance for each of the sets of images to determine an offset between a longitudinal axis of the tool with respect to the longitudinal axis of the conduit.

Determining the position of the tool may alternatively comprise:
  measuring the shift in position of common features between neighbouring images to determine an apparent velocity of each set of images; and
  comparing the apparent velocity for each of the sets of images to determine an offset between a longitudinal axis of the tool with respect to the longitudinal axis of the conduit.

The inspection tool may comprise a downview camera having a field of view with a centre line that extends substantially parallel to a longitudinal axis of the tool. Preferably, in this case, the overlapping images overlap in a direction parallel to the longitudinal axis of the conduit.

With this arrangement, determining the position of the tool may comprise:

identifying one or more common fixed features in the overlapping images, the or each common fixed feature being disposed at the same position in each image;

identifying a plurality of common moving features in the overlapping images, the position of each common moving feature being shifted in each image to define a trajectory of each common moving feature with respect to the or each common fixed feature; and analysing the trajectories of the common moving features to determine the position of the tool with respect to the longitudinal axis of the conduit.

Determining the position of the tool may comprise determining an offset between a longitudinal axis of the tool with respect to the longitudinal axis of the conduit and/or determining an angle between a longitudinal axis of the tool with respect to the longitudinal axis of the conduit.

The invention extends, in a second aspect, to a method of determining a dimension of a feature of interest in an image obtained by a conduit inspection tool having at least one camera for imaging the internal surface of a conduit. The method comprises:

correcting the image for non-centred tool geometry by applying the method of the first aspect of the invention to image data of the image; and calculating, using the determined position of the tool with respect to the longitudinal axis of the conduit, the dimension of the feature of interest.

In a third aspect, the invention provides a method of determining a dimension of a feature of interest in a conduit using an inspection tool having a camera for imaging the internal surface of a conduit, the method comprising:

arranging a reference marker of known dimension against the internal surface of the conduit within a field of view of the camera;

obtaining, from the inspection tool, an image in which the reference marker and the feature of interest are visible;

identifying the reference marker in the image;

determining the number of image pixels occupied by the known dimension of the reference marker;

determining a conversion factor based on the determined number of image pixels and the known dimension of the reference marker;

determining the size in image pixels of the feature of interest; and applying the conversion factor to the size to calculate the dimension of the feature of interest.

Preferably, the tool comprises the reference marker.

A further aspect of the present invention provides a method for determining the position of a conduit inspection tool having at least one camera for imaging the internal surface of a conduit relative to the longitudinal axis of the conduit. The method comprises:

obtaining at least two overlapping images of the internal surface of the conduit using the tool;

identifying one or more features common to at least a pair of the overlapping images; and determining, based on the positions of the or each common feature, the position of the tool with respect to a longitudinal axis of the conduit.

Further aspects of the present invention provide conduit inspection systems comprising an inspection tool and a computer system arranged to perform one or more of the methods of the above-described aspects of the invention.

Making geometrical corrections to the captured images, as provided for by embodiments of the present invention, permits more accurate monitoring of features on the wall of the pipe and/or downhole events. For example, the corrected images may be used for:

precision correlation of objects that are non-magnetic, asymmetric/complex geometry or small in size;

time lapse monitoring of corrosion/erosion, deposits/obstructions, milling/clean-up;

assisting in the cutting/punching/perforating of downhole hardware, the placement of abrasive/chemical cleaning agents, the removal of foreign objects, and the monitoring of production or leaks; or Blowout preventer (BOP) inspection, subsurface safety valve (SSSV) inspection, sliding sleeve or inflow control device (ICD) inspection, lock profile inspection, plug/packer/valve removal, sand control inspection.

Furthermore, when combined with other logging tools, the results from the method of this invention could correct other raw sensor readings for tool eccentricity. These tools could include: electromagnetic thickness, radial cement bond tools, multi-finger calliper pipe deformation surveys.

In some applications it may be desirable to map the 2-dimensional images captured by the cameras onto a 3-dimensional virtual model of the pipe. This may, for example, allow a virtual reality model of a pipe to be created. To allow the features captured in the images to be accurately positioned on a 3D model of the internal surface of the pipe, the image pixels must be positioned correctly in a model space at their reflection points. Accordingly, any distortions due to viewing geometry and eccentricity of the camera tool must be removed, which is facilitated by methods of the present invention.

Once a 3D model of the internal surface of the pipe has been created, it is envisaged that standard packages and techniques for viewing 3D objects (such as CAD packages, virtual reality (VR) technology) can then be used to view the 3D textured surface.

Preferred and/or optional features of each aspect of the invention may be used, alone or in appropriate combination, in the other aspects also.

DESCRIPTION OF EMBODIMENTS OF THE INVENTION

Figure 1A:
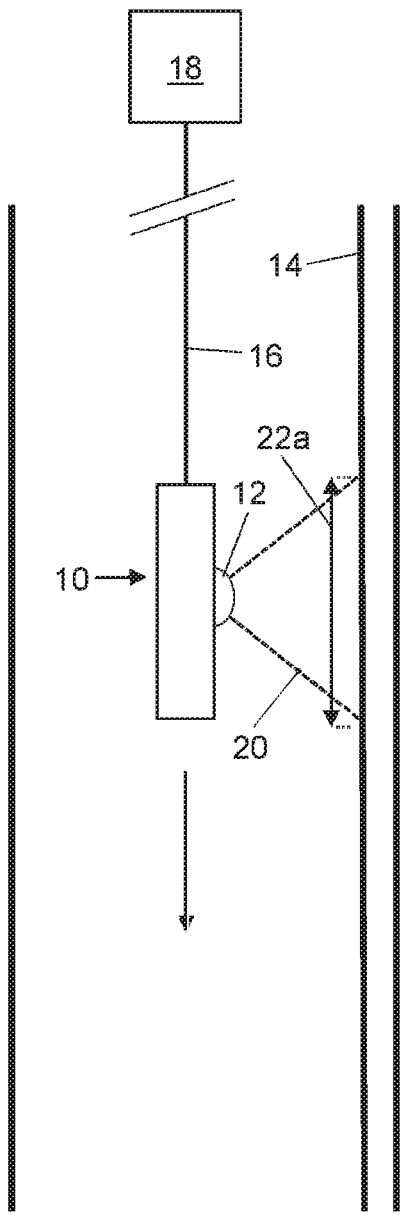
FIGS. 1a, 1b and 1c illustrate an inspection tool having a sideview camera capturing successive overlapping images of the internal surface of a pipe as the inspection tool is moved along the pipe.

FIG. 1a shows, schematically and in cross-section, an inspection tool 10 having an imaging device in the form of a sideways-facing visible light camera 12. The camera 12 captures images through a lens disposed in a side wall of the inspection tool 10. A centreline of the field of view of the camera 12 is substantially perpendicular to a longitudinal axis of the inspection tool 10. Such cameras are generally referred to as sideview cameras in the art of wellbore inspection tools.

The tool 10 is shown in operation in a pipe or conduit 14 of a well or other downhole structure. The tool 10 is suspended on a connecting line or downhole line which in this case comprises a cable 16. The cable 16 is attached to a surface control module 18, which is shown schematically in FIG. 1a only.

The control module 18 includes a winch for pulling in and paying out the cable 16, allowing the tool 10 to be moved axially along the pipe 14. By "axially", it is meant that the tool 10 transits in a direction generally parallel to the longitudinal axis of the pipe. As is generally known in the art, operation of the winch can be monitored and logged by the control module 18 so that the depth of the tool 10 as a function of time can be estimated from a displacement measurement of the cable 16. For example, the length of cable 16 payed out or pulled in may be measured directly or determined from the operating speed and direction of the winch, with the estimated depth of the tool 10 being equal to the length of cable 16 deployed at a given time.

The camera 12 of the tool 10 is arranged to capture successive images of the internal surface of the pipe 14 that lie within a field of view 20 of the camera 12. Conveniently, the successive images can be captured in the form of a video stream, in which successive images or frames are captured at intervals determined by the frame rate of the video stream.

Figure 1B:
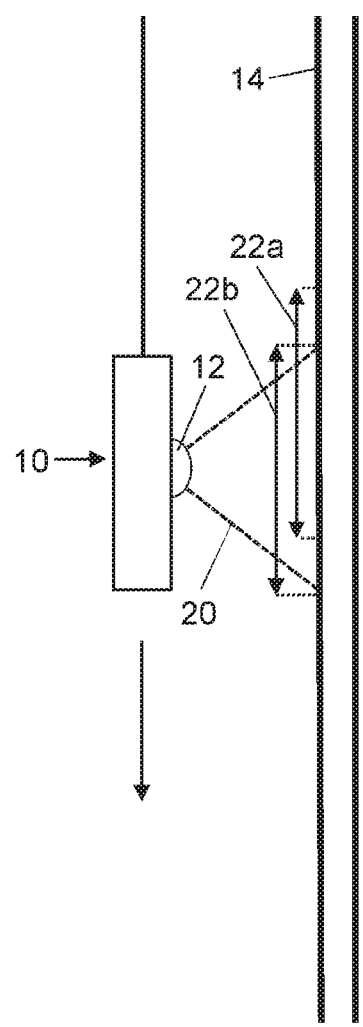
Figure 1C:
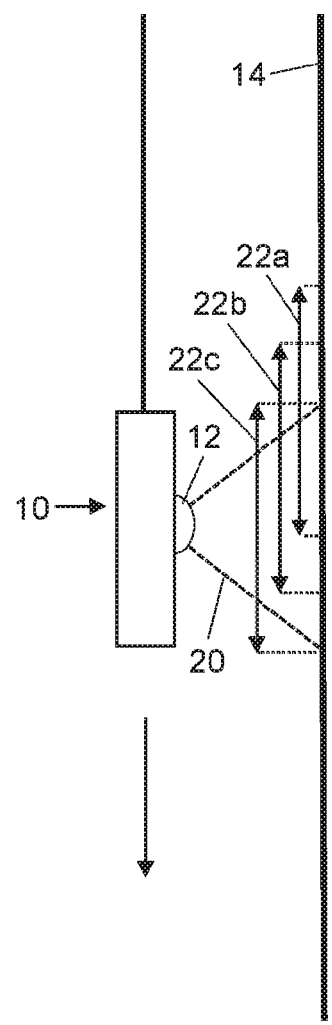

In FIG. 1a, the axial extent of a first image 22a is indicated. It will be appreciated that the circumferential extent of the image is not indicated in the cross-sectional view of FIG. 1a. FIGS. 1b and 1c show the position of the tool 10 with respect to the pipe 14 at subsequent points in time as the tool 10 moves downwardly along the pipe 14.

As illustrated in FIG. 1b, as the tool 10 moves along the pipe 14, the field of view 20 of the camera 12 shifts axially. The camera 12 then captures a second image 22b, corresponding to the subsequent frame in the video stream. The second image 22b overlaps axially with the first image. FIG. 1c shows the position of the tool 10 when a third image 22c is captured, corresponding to a further subsequent frame in the video stream. The third image 22c overlaps axially with the second image 22b. Further axially-overlapping images are captured as the tool 10 continues to move along the pipe 14. The elapsed time or transit time at which each image is obtained can be recorded.

Figure 2:
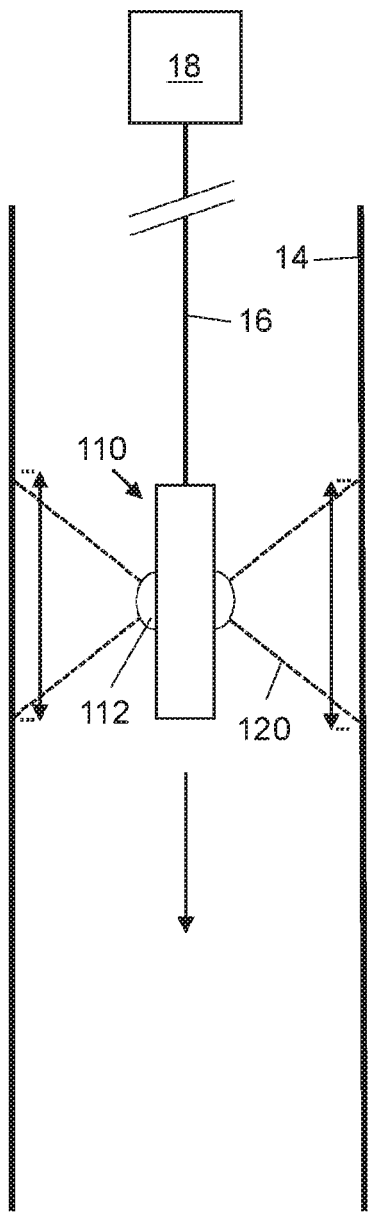
FIG. 2 illustrates an inspection tool having multiple sideview cameras capturing an image of the internal surface of a pipe.

FIG. 2 shows a variant of the tool 10 described above with reference to FIG. 1. The tool 110 of FIG. 2 comprises a plurality of side view cameras 112 such that there are a plurality of corresponding camera lenses spaced equidistantly around the circumference of the inspection tool 110. A centreline of the field of view 120 of each of the cameras 112 is substantially perpendicular to a longitudinal axis of the inspection tool 110.

Figure 3:
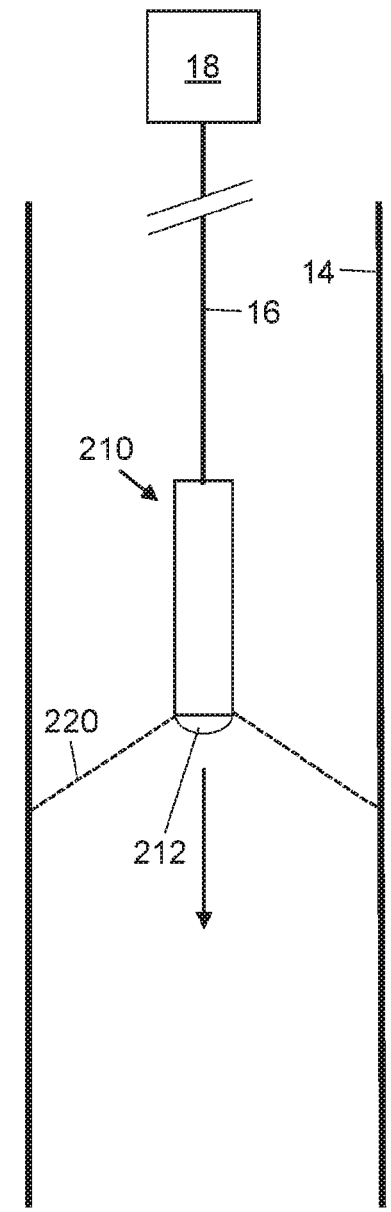
FIG. 3 illustrates an inspection tool having a downview camera capturing an image of the internal surface of a pipe.

FIG. 3 shows another inspection tool 210. In this case, the camera 212 is a downwards facing camera such that the camera captures images through a lens disposed at a distal end of the tool. In this case a centreline of the field of view 220 of the camera is preferably coaxial with a longitudinal axis of the inspection tool 210. The camera is generally referred to as a downview camera in the art of wellbore inspection tools.

In use, each of the tools of FIGS. 1, 2 and 3 can be used to obtain images of regions of the internal surface of the pipe 14. Each image provides image data comprising, for example, a set of pixel values (such as RGB intensities, grayscale values or the like) as a function of spatial position. Embodiments of the present invention provide methods and techniques for determining correction functions that can be applied to the image data so that each pixel value is assigned to a spatial position that best reflects the actual spatial position of that pixel on the inside surface of the pipe or conduit.

Figure 4:
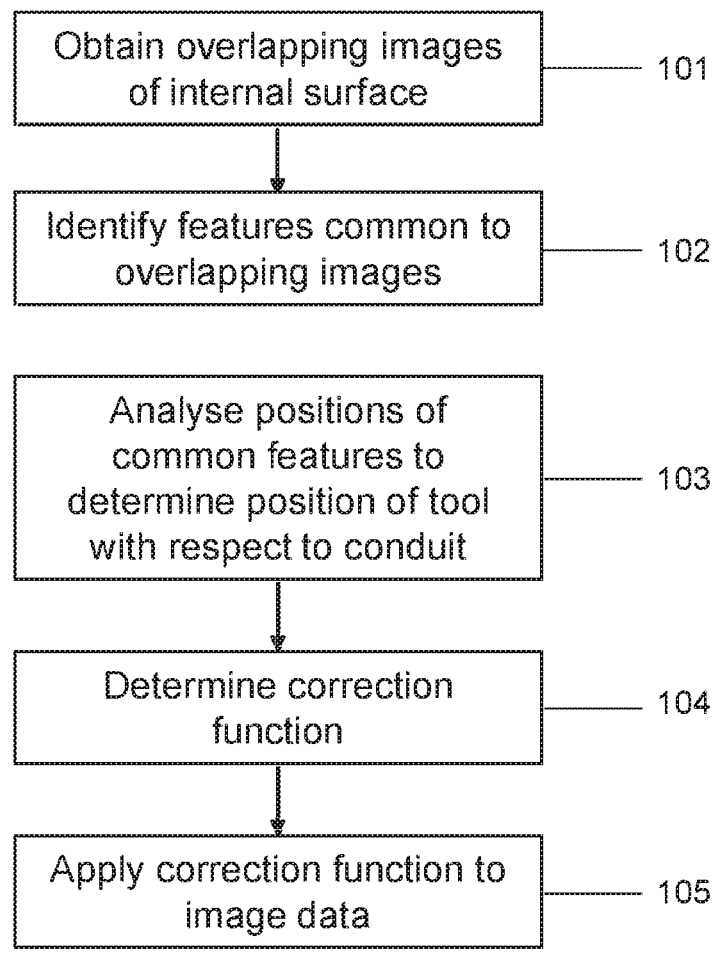
FIG. 4 is a flowchart showing steps in a method for determining correction values for images obtained using the inspection tools of FIGS. 1, 2 and 3.

Referring to FIG. 4, in general terms, a method of the invention involves first, in step 101, obtaining overlapping images of the internal surface of the conduit, for example using a tool as illustrated in FIG. 1, 2 or 3. Then, in step 102, the images are analysed to detect features that are common to two or more of the overlapping images. In step 103, the positions of the common features are analysed to determine the position of the tool with respect to the conduit. In step 104, one or more correction functions for the images are determined based on the determined position of the tool. In step 105, the correction functions are applied to the image data to obtain corrected images in which the correct spatial position is associated with each pixel value.

Examples of the implementation of the method of FIG. 4 in various circumstances will now be described.

Figure 5:
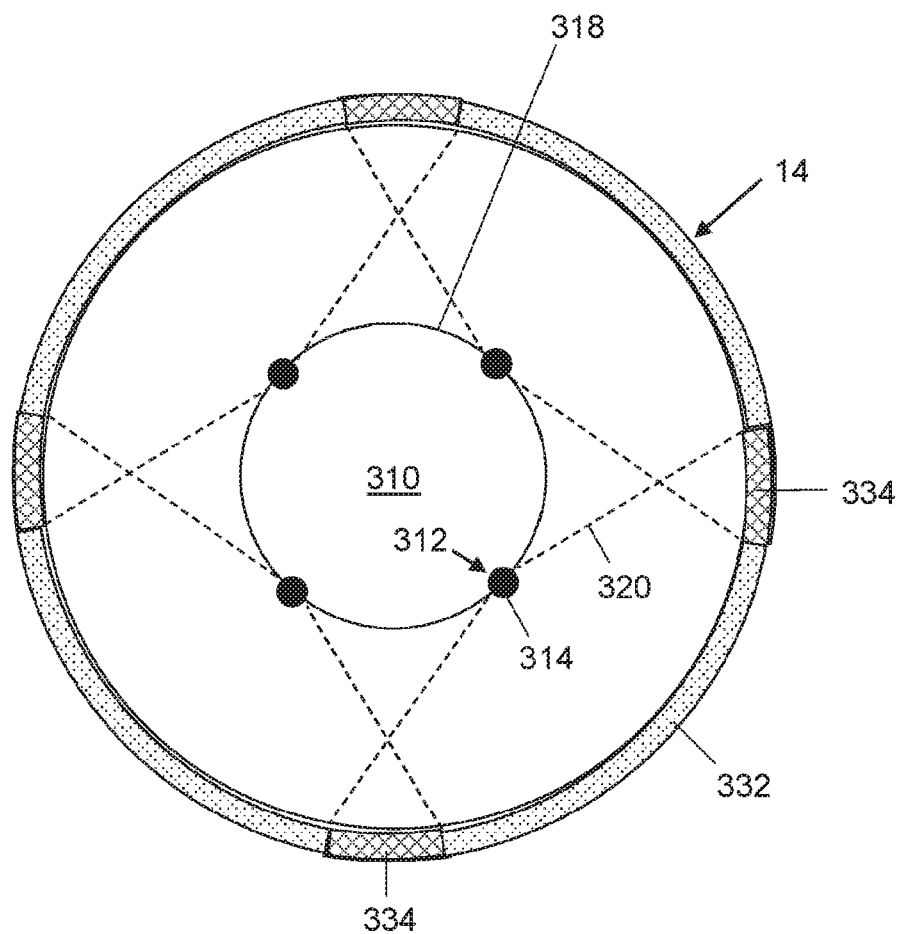
FIG. 5 is a plan view of an inspection tool centrally located within a pipe.

FIG. 5 is a plan view of an inspection tool 310 with multiple sideview cameras of the type shown in FIG. 2. In this example, the tool has four sideview cameras 312. Each of the cameras 312 captures images through a respective lens 314 disposed in a side wall 316 of the inspection tool 310, the camera lenses 314 being spaced equidistantly around the circumference 318 of the tool. A centreline of the field of view 320 of each of the cameras 312 is therefore substantially perpendicular to a longitudinal axis of the inspection tool 310 (i.e. parallel to the plane of FIG. 5).

The cameras lenses 314 are, in this example, disposed in a common plane (i.e. the plane of FIG. 5) that lies perpendicular to a longitudinal axis of the inspection tool 310. Accordingly, each of the camera lenses 314 is disposed at the same distance from an end of the inspection tool 310.

The cameras 314, which are mounted symmetrically and equiangularly around the inspection tool 310, are arranged such that, within a certain range of pipe diameters, there is an overlap in the fields of view 320 of neighbouring cameras 314. There is, therefore, a corresponding overlap in the captured images from neighbouring cameras 314.

Figure 6:
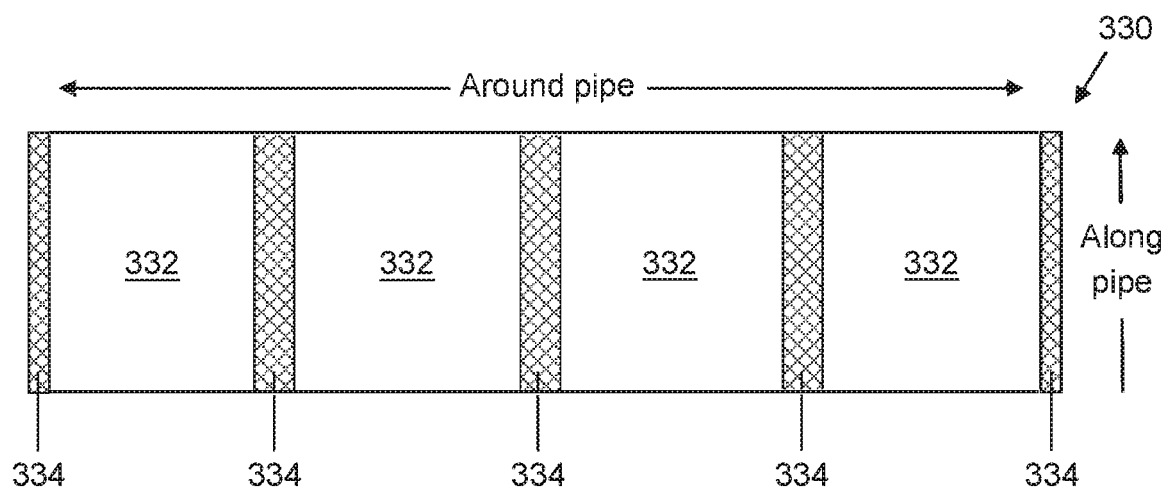
FIG. 6 illustrates a mosaic of images captured by the four cameras of the tool of FIG. 5, showing in particular regions of overlap between adjacent images.

FIG. 6 illustrates a mosaic or composite image 330 formed by combining the images 332 captured by each of the cameras 314. The regions of overlap between the images 332 are indicated at 334. The positions of the images 332 and regions of overlap 334 with respect to the internal surface of the pipe 14 are shown in FIG. 5.

When the inspection tool 310 is centred the pipe 14, the circumferential length of each region of overlap 334 between each of the neighbouring captured images will be equal, as shown in FIGS. 5 and 6. If the internal diameter of the pipe 14 is known, then the circumferential length of each region of overlap 334 will also be known.

Figure 7:
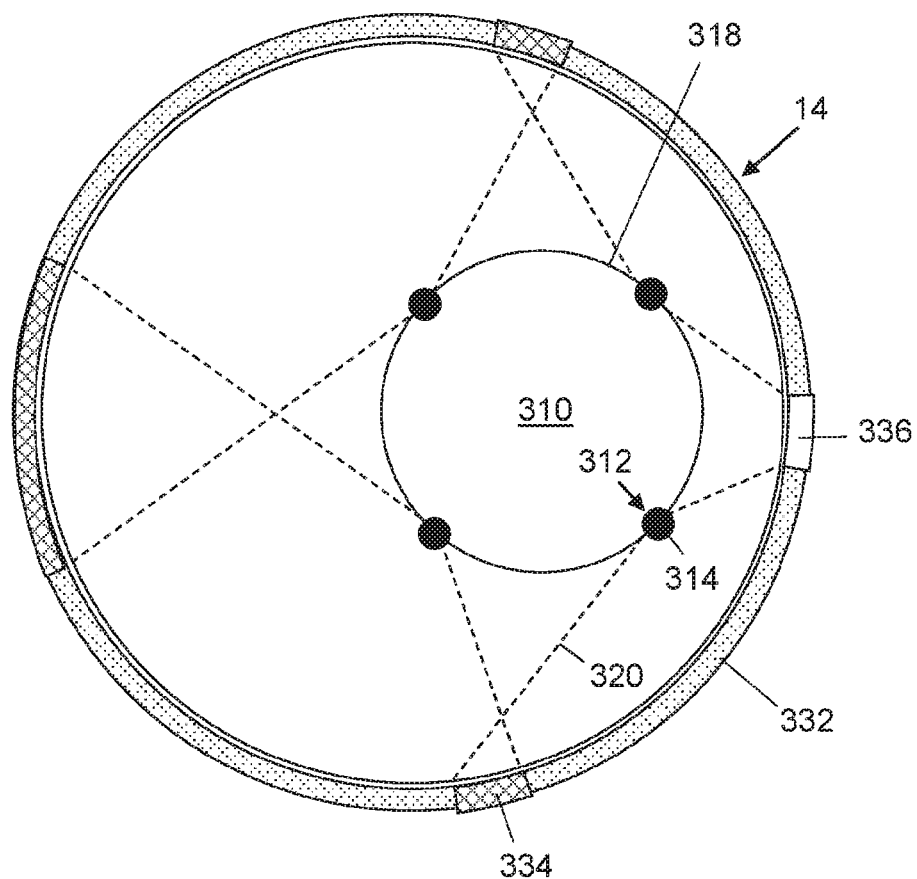
FIG. 7 is a plan view of a non-centred inspection tool disposed within a pipe.
Figure 8:
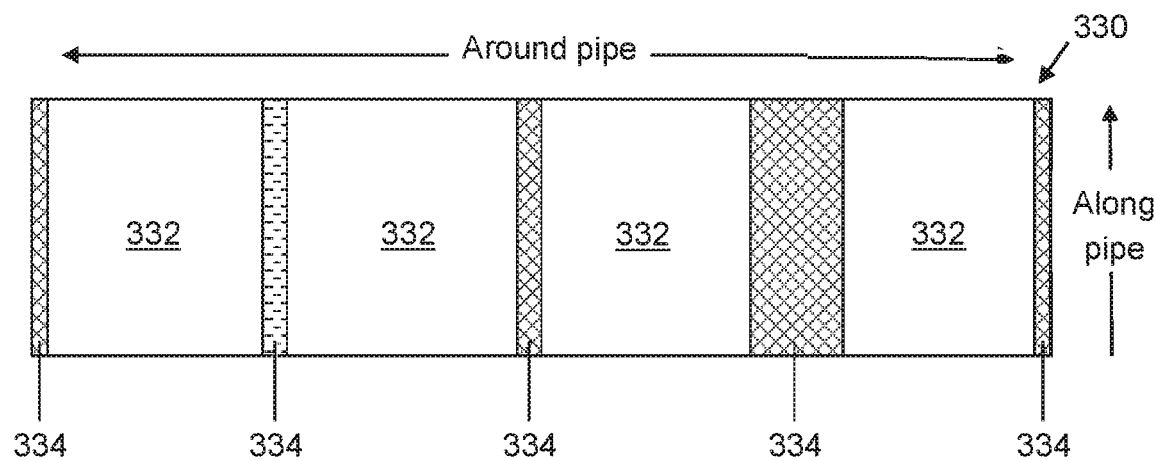
FIG. 8 illustrates a mosaic of images captured by the four cameras of the tool of FIG. 7, showing in particular regions of overlap between adjacent images.

FIG. 7 illustrates the case when the tool 310 is not centred in the pipe 14, with the corresponding composite image 330 shown in FIG. 8. In this case, the length of each region of overlap 334 between each of the neighbouring captured images 332 will not be equal. In the illustrated example, part 336 of the internal surface of the pipe 14 is not imaged by any of the cameras 314.

By determining and analysing the length of each region of overlap 334 between circumferentially neighbouring images 332, the position of the tool 310 with respect to the longitudinal axis of the pipe 14 can be determined.

Figure 9:
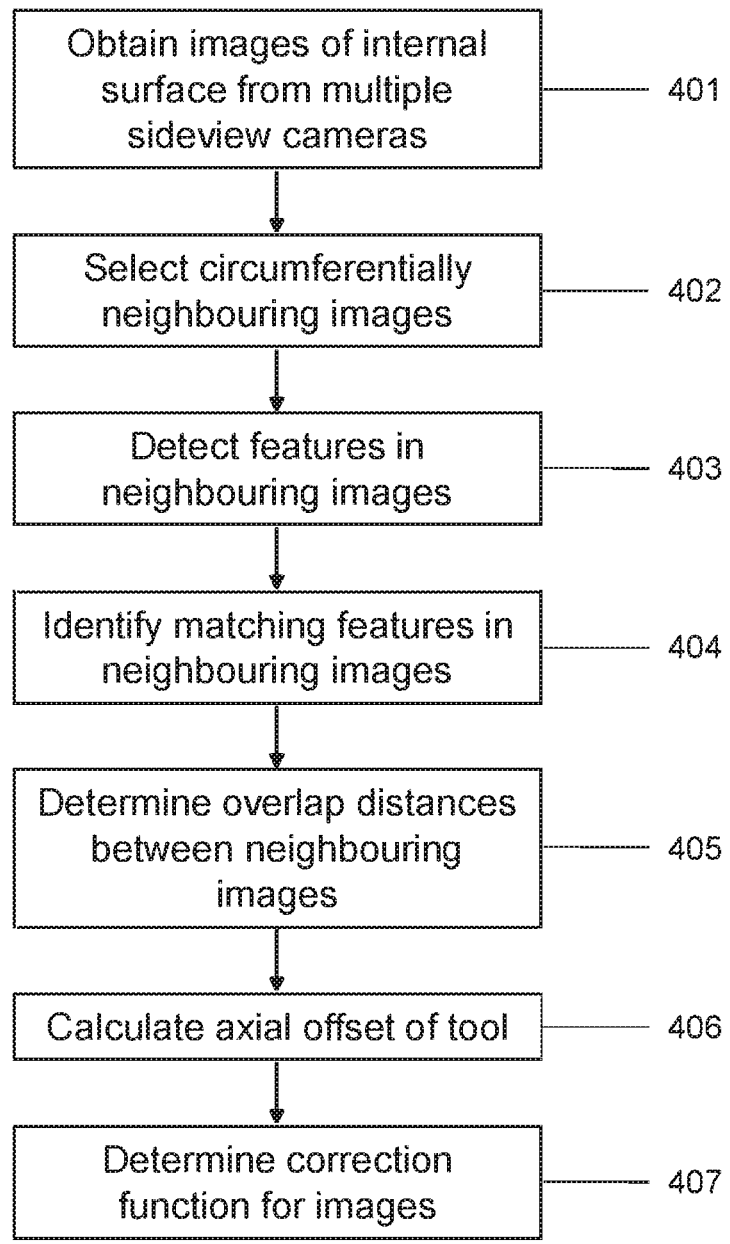
FIG. 9 is a flowchart showing steps in a method for determining correction values for images obtained using the tool of FIG. 7.

Referring to FIG. 9, therefore, in a first step 401 of a method according to an embodiment of the invention, images of the internal surface of the pipe 14 are obtained from multiple sideview cameras, as described with reference to FIGS. 5 to 8. Conveniently, the images may be acquired in the form of multiple video streams, with one video stream obtained by each camera.

In step 402, circumferentially neighbouring images are selected from the images obtained by the cameras in step 401. When the images are in the form of multiple video streams, this step may, for example, comprise extracting an image from each video stream with an identical time stamp.

In step 403, reference features are detected in each of the neighbouring images. These features may for example be regions where the image intensity is greater than or less than a threshold value.

In step 404, reference features that are common to a pair of neighbouring images are identified. This may for example be achieved by identifying cases where a particular spatial distribution of reference features in one image is repeated in a neighbouring image.

In step 405, the overlap distance (i.e. the circumferential length of the region of overlap) between each pair of neighbouring images is determined, based on the region of each image in which matching reference features are present.

Figure 10:
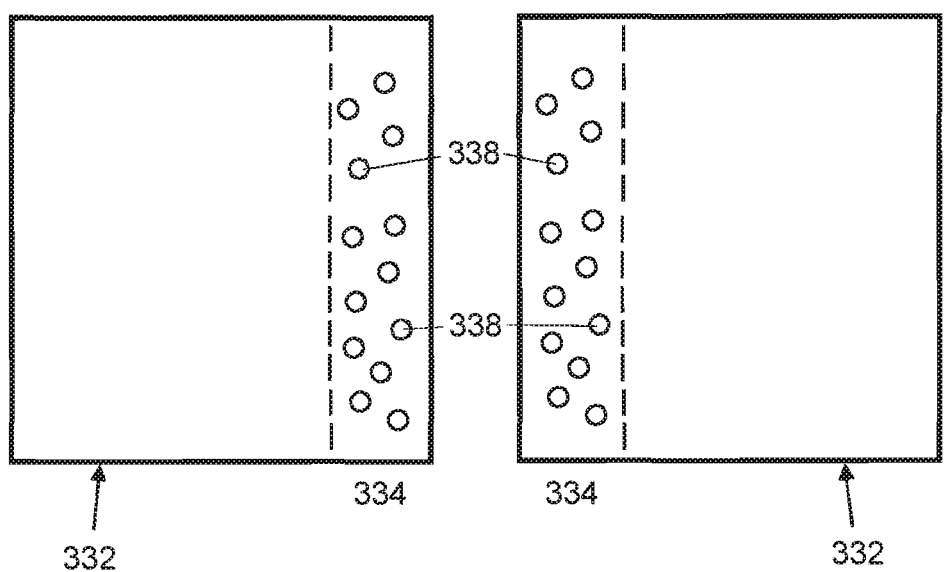
FIG. 10 is a schematic illustration of two images captured by adjacent cameras of the tool of FIG. 7.

FIG. 10 illustrates a pair of neighbouring images 332 in which matching reference features 338 have been identified in each image 332, so that the length of the region of overlap 334 between the images can be determined.

Returning to FIG. 9, in step 406, the overlap distances are used to calculate the axial offset of the tool (i.e. the distance and direction in which the longitudinal axis of the tool is displaced from the longitudinal axis of the pipe).

In step 407, the axial offset is then used to determine a correction function for the images. The correction function can subsequently be used to scale the images to correct for the axial offset of the tool. The corrected images may then be used to construct an accurate composite image of the inside pipe surface.

The amount of overlap between neighbouring captured images may be determined in different ways using suitable image analysis techniques. In one alternative example, the overlap is determined by finding the overlap position between adjacent images with the maximum cross-correlation of image intensity, which will correspond to the regions of the images that share common features.

Figure 11:
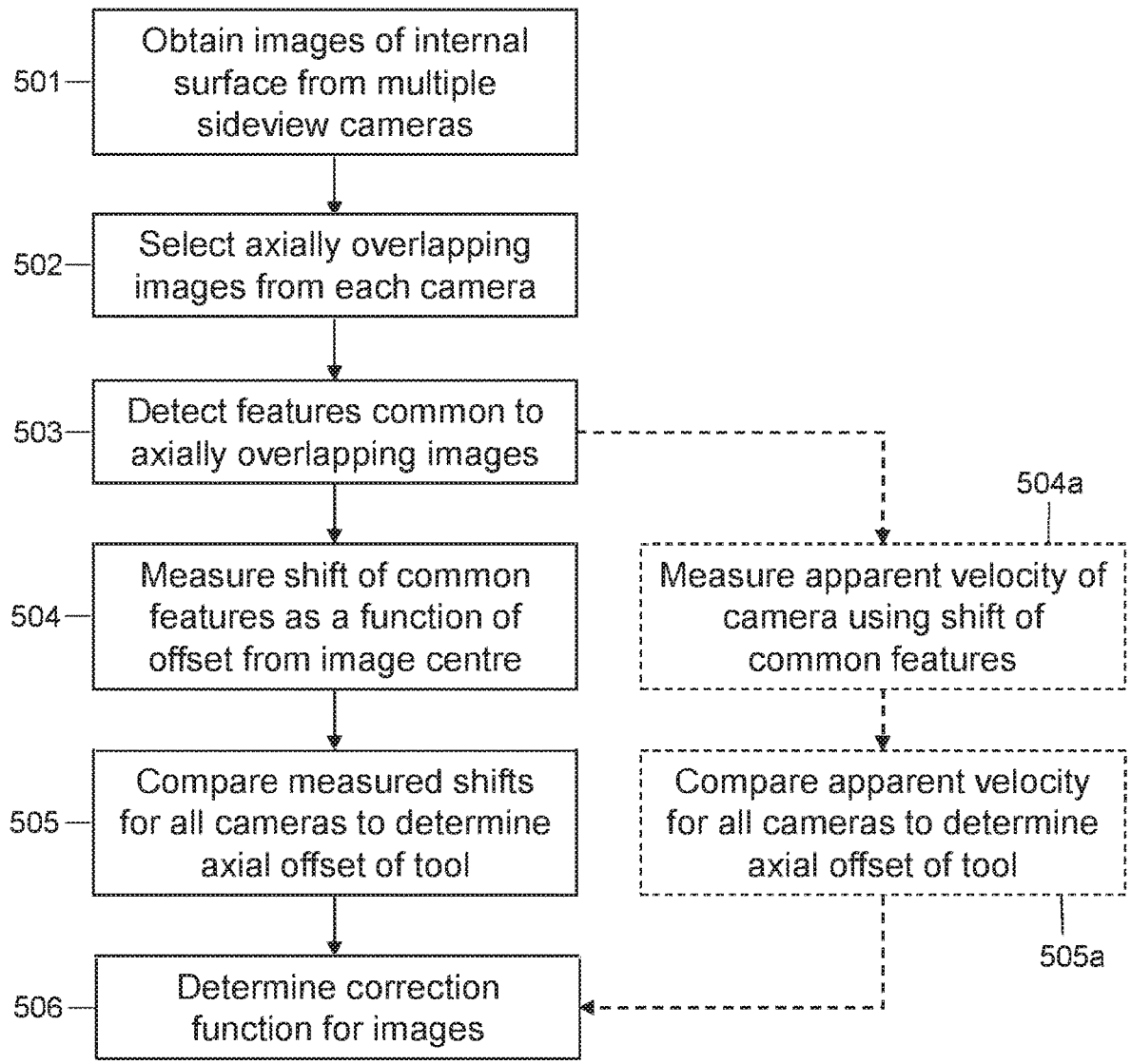
FIG. 11 is a flowchart showing steps in another method for determining correction values for images obtained using the tool of FIG. 7.

FIG. 11 describes an alternative method according to the present invention for determining correction functions for images obtained from a tool having multiple sideview cameras, as illustrated in FIGS. 2, 5 and 7.

A first step 501 comprises obtaining images from each of the sideview cameras of the tool. Preferably, each of the multiple cameras mounted symmetrically around the inspection tool acquires video data as the tool progresses down or along the pipe. Successive images or frames from the video captured by each camera will overlap in the axial direction, as the frame rate of the video is greater than the speed of travel of the inspection tool along the pipe.

Near the centre of the images the shift between successive images, i.e. the distance a feature has travelled between successive images, will be equal to the speed of the inspection tool multiplied by the time between images (frame rate).

Due to imaging geometry, however, the shift observed between successive images of a feature at a distance from the centre of the images, in a direction parallel to a longitudinal axis of the pipe, is a function of the distance of the lens from the pipe wall.

Accordingly, a further step 502 in this method comprises selecting pairs of axially overlapping images from each camera.

In step 503, features common to both images in each pair of axially overlapping images are identified.

Figure 12:
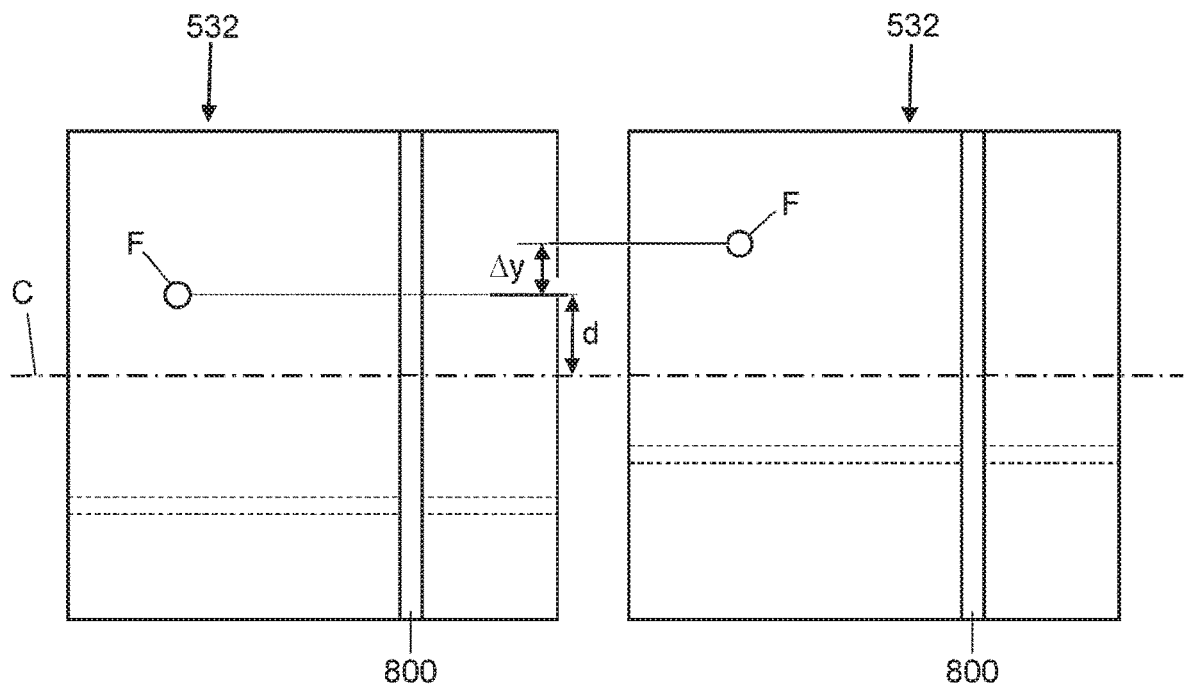
FIG. 12 is a schematic illustration of two images captured at successive times by the tool of FIG. 7.

FIG. 12 illustrates a pair of axially-overlapping images 532, such as successive frames in a video stream, in which a common feature F has been identified. Here, the direction of movement of the inspection tool is vertical, so that feature F shifts vertically by a distance $\Delta y$ between the images 532.

Returning to FIG. 11, in step 504, the shift $\Delta y$ between the position of several pairs of common features F in successive images is measured as a function of distance d from the centre line C of the field of view of one of the images (see FIG. 12), or from the average position of the centre line C between the overlapping images. The variation in shift with distance from the centre line is calculated for each of the sets of successive images captured by each of the cameras around the circumference of the inspection tool.

In step 505, the variation in shift for each of the sets of successive images captured by each of the cameras is compared. From this comparison, the axial offset of the inspection tool (i.e. the distance and direction of the inspection tool from the centre of the pipe) can be determined.

In step 506, a correction function is determined based on the axial offset. A further step in the method may then be to apply the geometrical correction functions to each image. The corrected images may then be used to construct an accurate composite image of the inside pipe surface, which could be viewed as a 3D representation of the pipe surface.

In a variant of the method of FIG. 11, after detecting the features common to the axially overlapping images in step 503, in step 504a the apparent axial velocity of each camera is calculated by determining the shift of the common features between the images as a function of time. Then, in step 505a, the apparent axial velocities of each of the cameras is compared to determine the axial offset of the tool. A suitable correction function for the images can then be determined in step 506.

Figure 13:
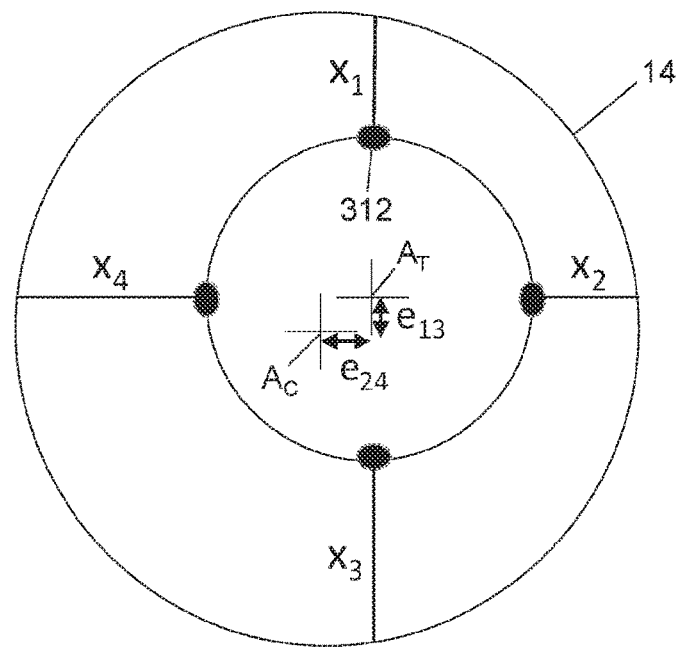
FIG. 13 is a schematic plan view of a non-centred inspection tool disposed within a pipe illustrating the non-centred geometry.

The determination of the axial offset of the tool in step 505a of FIG. 11 can for example be performed as follows. Referring to FIG. 13, the apparent velocity $V_i$ of each camera i is proportional to the distance $x_i$ between the lens of each camera 312 and the internal surface of the pipe 14. Therefore:

$$x_i = kV_i$$

for each camera i where k is a constant. By considering the geometry of FIG. 13, $$x_1 + x_3 + 2R \approx x_2 + x_4 + 2R \approx D$$

where R is distance from the tool centre to each camera lens, which is known, and D is the known pipe diameter. The constant k can then be approximated by:

$$k \approx (D-2R)/(V_1+V_3) \approx (D-2R)/(V_2+V_4)$$

The eccentricity or axial offset e of the axis of the tool $A_T$ relative to the centre of the pipe $A_C$ can be calculated in two orthogonal directions relative to the lens positions:

$$e_{13} = x_3 - x_1 = k(V_3 - V_1)$$

and $$e_{24} = x_4 - x_2 = k(V_4 - V_2).$$

It will be appreciated that within a wellbore, an inspection assembly will typically be surrounded by a fluid. Accordingly, a gas or a liquid will be disposed between the camera lens and the internal wall of the pipe. It is, therefore, important to account for the refractive index of the fluid when calculating the geometrical correction function. In particular, for each pixel in an image, the arrival elevation angle and azimuth angle is calculated for the light rays entering the camera lens. These angles are obtained by calibrating each lens in the appropriate borehole fluid to correctly account for the refractive index at the lens/fluid interface.

It will be understood that, when the internal diameter of the pipe is known, the axial offset of the tool can be calculated in terms of a distance measurement. Furthermore, the scale of the corrected images (in pixels per unit distance, for example) can be readily calculated so that the dimension of a feature of interest on the internal surface of the pipe can be determined from the corrected images. When the internal diameter of the pipe is not known, the axial offset of the tool may for example be expressed as a percentage of the (unknown) pipe radius or diameter.

The methods described above with reference to FIGS. 4 to 13 could also be used to determine correction functions for images obtained from an inspection tool with a single sideview camera (such as shown in FIG. 1), provided that the tool is configured so that the field of view of the camera can rotate around the axis of the tool through and angle that is less than the angular extent of the field of view. In this way, suitable circumferentially overlapping images could be captured for use in the method of FIG. 9, or suitable sets of axially overlapping images at different azimuthal positions around the pipe could be captured for use in the method of FIG. 11.

Figure 14:
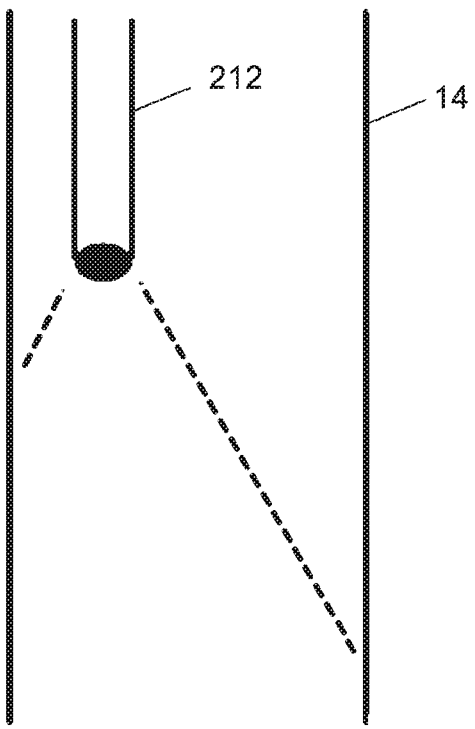
FIG. 14 illustrates the field of view of a downview camera of an inspection tool that is non-centred and with an axis of the tool being parallel to an axis of the pipe.
Figure 15:
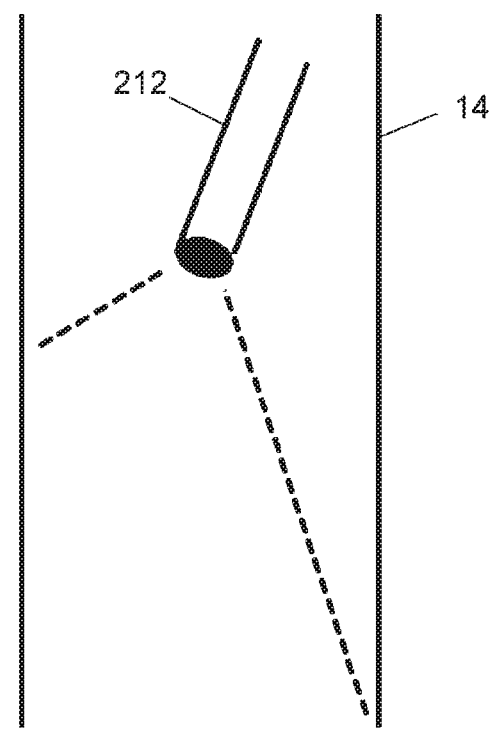
FIG. 15 illustrates the field of view of a downview camera of an inspection tool where an axis of the tool is at an angle to an axis of the pipe.

When the inspection tool includes a downview camera, as illustrated in FIG. 3, a different approach to the determination of correction functions may be applied. The images obtained from such a tool can be affected by the axis of the tool 212 being offset from the axis of the pipe 14, as shown in FIG. 14, by the axis of the tool 212 being tilted (i.e. not parallel) with respect to the axis of the pipe 14, as shown in FIG. 15, or by a combination of these two conditions.

Figure 16:
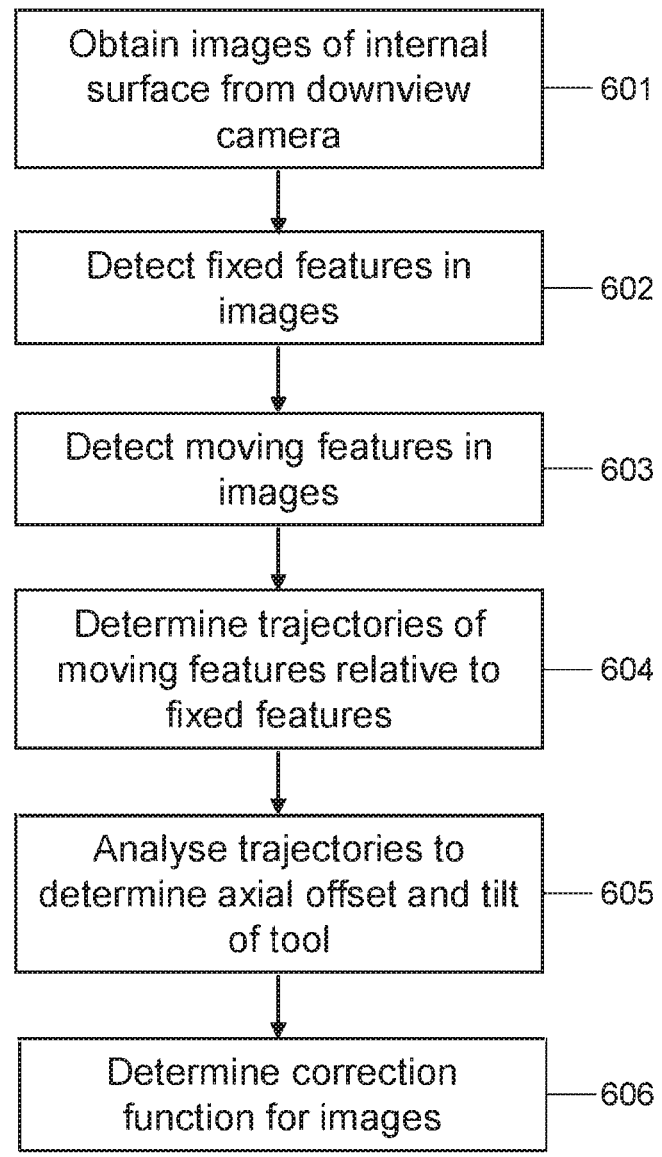
FIG. 16 is a flowchart showing steps in a method for determining correction values for images obtained using the tools of FIG. 14 or FIG. 15.

FIG. 16 shows steps in a method for determining suitable correction functions for the axial offset and tilt of the tool.

In step 601, a set of overlapping images of the internal surface of the pipe is obtained from the downview camera.

In step 602, one or more features common to all of the images are detected in the set or plurality of images. This common feature or fixed feature may, for example, be the vanishing point. The fixed features may be detected automatically by means of suitable image recognition techniques, such as by detecting the characteristic shape and contrast of the far pipe (the vanishing point).

In step 603, one or more moving features are detected in the set of images. These are features that are stationary in the pipe or conduit such that the position of these features in successive images captured by the camera moves according to the location of the camera in the pipe. For example, parts or regions of each of the images having high contrast may be automatically detected and their positions recorded.

In step 604, the changes in the spatial positions of the detected moving features are tracked between successive images in the set of images to determine a trajectory for each of the detected moving features, relative to the reference frame provided by the fixed features.

Figure 17:
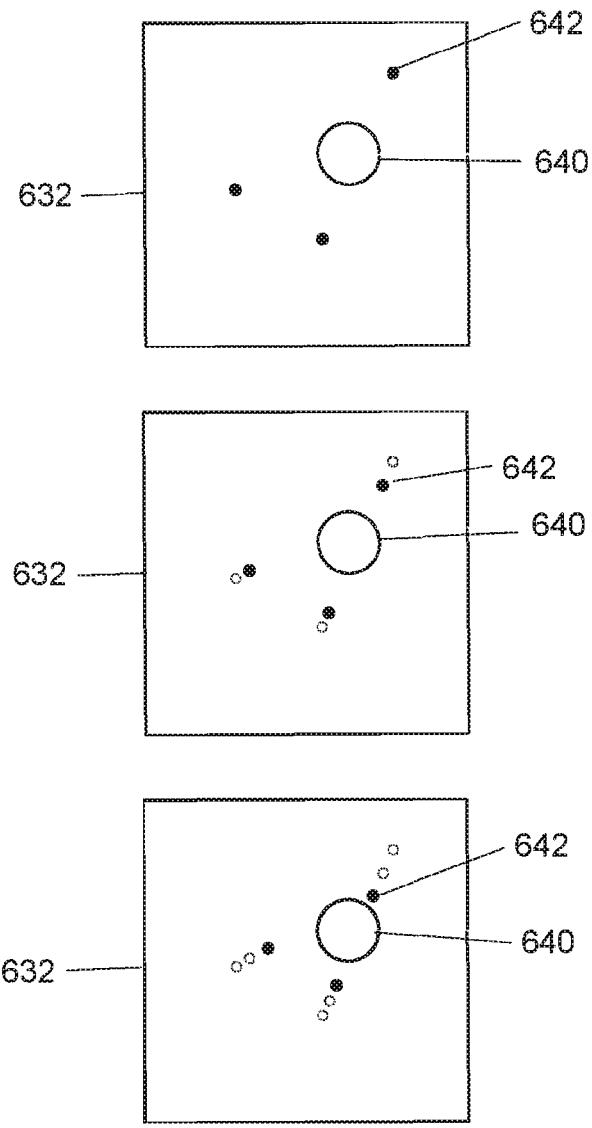
FIG. 17 is a schematic illustration of three images captured at successive times by the tools of FIG. 14 or FIG. 15.

FIG. 17 illustrates three successive images 632 from a downview camera, in which the fixed feature of the vanishing point 640 has been identified in each image. Several moving features 642 and the corresponding trajectories are also indicated.

Referring back to FIG. 16, in step 605, the trajectories are analysed to determine the axial offset and tilt of the camera, and therefore the tool.

In step 606, the camera position information calculated in step 605, including the offset of the camera lens from a central axis of the pipe and the angular tilt of the tool relative to the axis of the pipe, is used to calculate a geometrical correction function that is applied to each pixel of an image. The correction function may take into account a lens calibration in the appropriate borehole fluid, as described above.

The corrected images can be used to create a corrected composite image of the internal surface of the pipe. The corrected image pixels could also be mapped onto their correct spatial reflection points on a 3D virtual model of the pipe.

It will be appreciated that correction functions determined by the methods described above can be applied to the image data of the raw images used in the methods to obtain corrected versions of those raw images. However, the correction functions could also be applied to other image data obtained by the inspection tool during the same logging procedure. For example, the correction functions could be calculated only for some of the video frames in a video sequence obtained by the tool, and then the correction functions could be applied to the remaining frames in the video sequence with suitable interpolation.

One the position of the tool with respect to the pipe axis has been determined by one of the methods described above, the position information can also be used to correct or interpret data obtained from other sensors disposed on the inspection tool during the same logging run.

The methods described above allow the actual position of the camera relative to the surface of the pipe to be determined. This distance can then be used to calculate an accurate value for a dimension of a feature of interest on the surface of the pipe.

Figure 18:
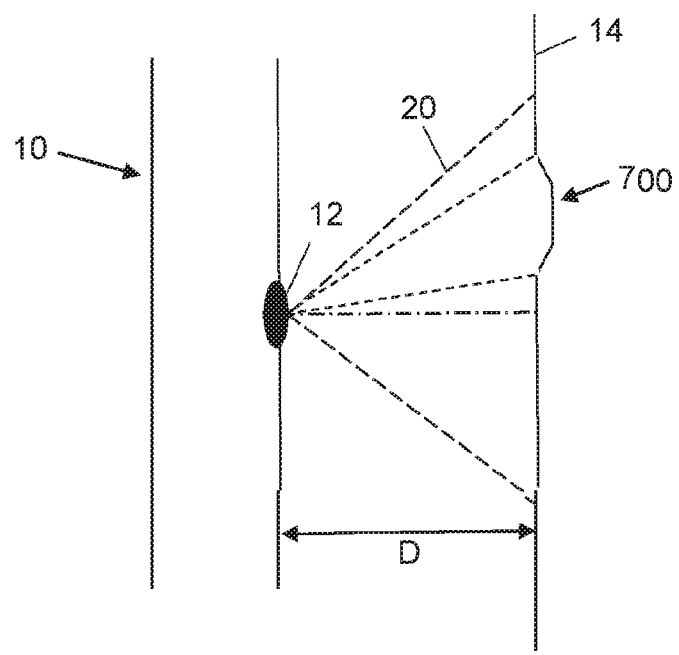
FIG. 18 illustrates an inspection tool having a sideview camera imaging a feature of interest on the internal surface of the pipe.

As illustrated in FIG. 18 for the case of a sideview camera 12, a feature of interest 700 is identified in an image captured by the camera 12. The actual distance D of the tool 10, and in particular the camera 12, from the surface of the pipe 14 in the vicinity of the feature 700 is determined using one of the methods described above. A dimension of the feature is then calculated from the actual distance D of the camera 12 from the surface and the angular position of the feature of interest 700 within the field of view 20 of the camera 12, i.e. the position of the feature 700 within the captured image.

In a further embodiment, a more accurate value for a distance between two features of interest may be calculated taking into account a difference in height between the two features. In this embodiment the features of interest must be captured in a region of overlap between two images. Stereoscopic imaging equations may then be used to calculate the distance between the two features of interest. This may be of particular relevance, for example, when a corrosion pit is located near an inwardly projecting feature of the pipe.

The use of stereoscopic imaging techniques may also be used to provide an indication of a height or depth of a feature of interest in an image. The feature of interest must be present in a region of overlap between two successive images. Stereoscopic calculations may then be used to provide an indication of the height or depth of the feature of interest relative to the surrounding surface of the pipe.

In some cases, the diameter of the pipe may not be known. In this case, one method of determining the dimensions of features in the images involves the use of at least one reference marker of known dimension that is placed against, projected onto or otherwise disposed on the internal surface. Preferably, the reference marker is carried by or projected from the tool, although a feature of known dimension that is fixed with respect to the internal surface of the conduit, such as a collar, could also be used as a reference marker.

In one example, a plurality of reference markers are provided in the form of reference blades 800, one of which is visible in both images 532 in FIG. 12. The reference blades 800 comprise metal bands or similar structures of known width that extend from the tool body to contact the wall of the pipe 14. The reference blades 800 may be part of a centralising apparatus for the tool.

The reference blades 800 are arranged so that a region of at least one reference blade 800 that is in contact with the pipe wall is within the field of view of the camera, and so that the known width dimension of the blade is perpendicular to the optical axis of the camera. In some arrangements, the reference blades 800 are arranged to centralise the tool 10 in the pipe 14.

Figure 19:
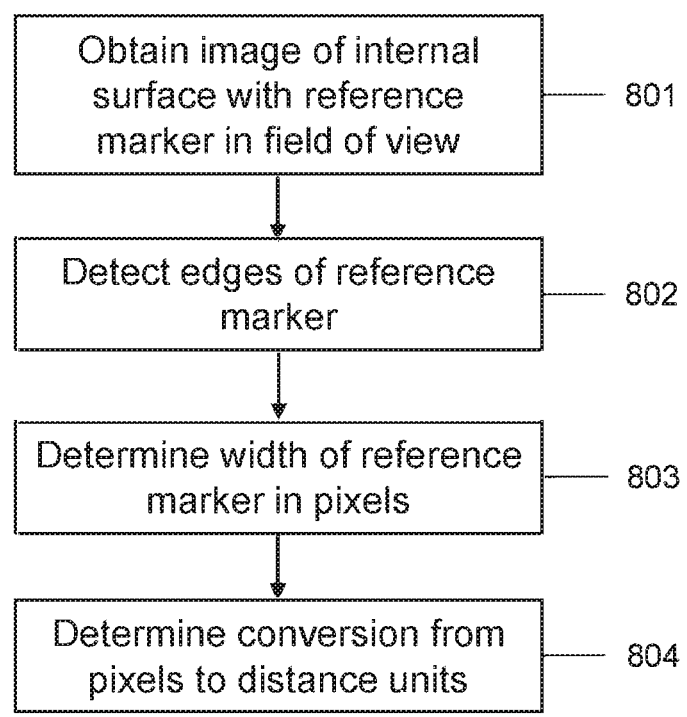
FIG. 19 is a flowchart showing steps in a method for determining the dimension of a feature of interest.

FIG. 19 describes steps in a method of using the reference blades 800 to determine dimensions of features in images. In step 801, one or more images of the internal surface are obtained in which a reference blade 800 or other marker of known width is in the field of view. In step 802, the edges of the reference blade 800 are detected by suitable image analysis techniques. In step 803, the width of the reference blade 800 in pixels (i.e. the number of image pixels occupied by the reference blade 800 across its width) is determined. In step 804, a conversion factor to convert image pixels to distance can be calculated for example by dividing the known width of the blade 800 by the observed width in pixels.

The conversion factor can then be used to determine the dimensions of other features in the images, taking appropriate account of the distance of each feature from the centre line of the image.

It will be appreciated that the methods described above can be applied to the imaging of substantially any surface or sub-surface conduit, including pipes, wellbores, cased and uncased holes, and so on.

The devices and/or components described herein can perform one or more processes and/or methods described herein. For example, the devices and/or components can perform at least a portion of such processes and/or methods based on a processor executing software instructions stored by a computer-readable medium, such as memory and/or storage component. A computer-readable medium (e.g., a non-transitory computer-readable medium) is defined herein as a non-transitory memory device. A memory device includes memory space located inside of a single physical storage device or memory space spread across multiple physical storage devices. When executed, software instructions stored in a computer-readable medium may cause a processor to perform one or more processes and/or methods described herein. Additionally, or alternatively, hardwired circuitry may be used in place of or in combination with software instructions to perform one or more processes and/or methods described herein. Thus, embodiments described herein are not limited to any specific combination of hardware circuitry and software.

It will be understood that further modifications and variations not explicitly described above can also be made without departing from the scope of the invention as defined in the appended claims.

The invention claimed is:

1. A method for correcting for non-centred tool geometry in image data obtained by a conduit inspection tool having at least one camera for imaging the internal surface of a conduit, the method comprising:
   obtaining at least two overlapping images of the internal surface of the conduit using the tool;
   identifying one or more features common to at least a pair of the overlapping images;
   determining, based on the positions of the or each common feature, the position of the tool with respect to a longitudinal axis of the conduit;
   determining a correction function based on the position of the tool; and
   applying the correction function to the image data.

2. The method according to claim 1, wherein the inspection tool comprises at least one sideview camera having a field of view with a centre line that extends substantially perpendicularly to a longitudinal axis of the tool.

3. The method according to claim 2, wherein the inspection tool comprises a plurality of sideview cameras arranged on a common plane perpendicular to the longitudinal axis of the tool.

4. The method according to claim 1, wherein the overlapping images overlap circumferentially with respect to the longitudinal axis of the conduit.

5. The method according to claim 3, wherein the overlapping images overlap circumferentially with respect to the longitudinal axis of the conduit, and wherein the method comprises obtaining the circumferentially overlapping images of the internal surface of the conduit by simultaneously obtaining an image from each of the sideview cameras.

6. The method according to claim 4, wherein determining the position of the tool comprises:
   determining, from the common features identified in pairs of neighbouring images, the lengths of regions of overlap between the neighbouring images; and
   calculating, from the length of the regions of overlap, an offset between a longitudinal axis of the tool with respect to the longitudinal axis of the conduit.

7. The method according to claim 2, comprising obtaining a plurality of sets of overlapping images, wherein each set of images is obtained at a different angular position around the circumference of the conduit and wherein pairs of neighbouring images in each set of images overlap in a direction parallel to the longitudinal axis of the conduit.

8. The method according to claim 7, wherein determining the position of the tool comprises:
   measuring the shift in position of common features between neighbouring images as a function of distance from the centre line of the field of view; and
   comparing the shift in position as a function of distance for each of the sets of images to determine an offset between a longitudinal axis of the tool with respect to the longitudinal axis of the conduit.

9. The method according to claim 7, wherein determining the position of the tool comprises:
   measuring the shift in position of common features between neighbouring images to determine an apparent velocity of each set of images; and
   comparing the apparent velocity for each of the sets of images to determine an offset between a longitudinal axis of the tool with respect to the longitudinal axis of the conduit.

10. The method according to claim 1, wherein the inspection tool comprises a downview camera having a field of view with a centre line that extends substantially parallel to a longitudinal axis of the tool.

11. The method according to claim 10, wherein the overlapping images overlap in a direction parallel to the longitudinal axis of the conduit.

12. The method according to claim 11, wherein determining the position of the tool comprises:
   identifying one or more common fixed features in the overlapping images, the or each common fixed feature being disposed at the same position in each image;
   identifying a plurality of common moving features in the overlapping images, the position of each common moving feature being shifted in each image to define a trajectory of each common moving feature with respect to the or each common fixed feature; and
   analysing the trajectories of the common moving features to determine the position of the tool with respect to the longitudinal axis of the conduit.

13. The method according to claim 12, wherein determining the position of the tool comprises determining an offset between a longitudinal axis of the tool with respect to the longitudinal axis of the conduit.

14. The method according to claim 12, wherein determining the position of the tool comprises determining an angle between a longitudinal axis of the tool with respect to the longitudinal axis of the conduit.

15. A method of determining a dimension of a feature of interest in an image obtained by a conduit inspection tool having at least one camera for imaging the internal surface of a conduit, the method comprising:
   correcting the image for non-centred tool geometry by applying the method of any preceding claim to image data of the image; and
   calculating, using the determined position of the tool with respect to the longitudinal axis of the conduit, the dimension of the feature of interest.

16. A method of determining a dimension of a feature of interest in a conduit using an inspection tool having a camera for imaging the internal surface of a conduit, the method comprising:
   arranging a reference marker of known dimension against the internal surface of the conduit within a field of view of the camera;
   obtaining, from the inspection tool, an image in which the reference marker and the feature of interest are visible;
   identifying the reference marker in the image;
   determining the number of image pixels occupied by the known dimension of the reference marker;
   determining a conversion factor based on the determined number of image pixels and the known dimension of the reference marker;
   determining the size in image pixels of the feature of interest; and
   applying the conversion factor to the size to calculate the dimension of the feature of interest.

17. The method according to claim 16, wherein the tool comprises the reference marker.

* * * * *